United States Patent
Schneider

(10) Patent No.: US 10,926,274 B2
(45) Date of Patent: Feb. 23, 2021

(54) VISCOUS SPEED RETARDING DEVICE FOR ROTARY NOZZLES WITH INTERNAL PISTON FOR THERMAL EXPANSION

(71) Applicant: STONEAGE, INC., Durango, CO (US)

(72) Inventor: Joseph A. Schneider, Durango, CO (US)

(73) Assignee: STONEAGE, INC., Durango, CO (US)

(*) Notice: Subject to any disclaimer, the term of this patent is extended or adjusted under 35 U.S.C. 154(b) by 0 days.

(21) Appl. No.: 16/563,400

(22) Filed: Sep. 6, 2019

(65) Prior Publication Data

US 2020/0114373 A1 Apr. 16, 2020

Related U.S. Application Data

(60) Provisional application No. 62/745,172, filed on Oct. 12, 2018.

(51) Int. Cl.
*F16D 57/00* (2006.01)
*B05B 3/00* (2006.01)
(Continued)

(52) U.S. Cl.
CPC ............ *B05B 3/005* (2013.01); *B05B 3/06* (2013.01); *F16F 9/064* (2013.01); *F16F 9/14* (2013.01); *B05B 3/1042* (2013.01); *F16D 57/00* (2013.01)

(58) Field of Classification Search
CPC ....... B08B 9/0433; B08B 9/045; B08B 9/047; F16F 9/14; F16F 9/145; F16F 9/064;
(Continued)

(56) References Cited

U.S. PATENT DOCUMENTS 2,057,842 A 10/1936 Nielsen
4,088,191 A 5/1978 Hutchison
(Continued)

FOREIGN PATENT DOCUMENTS

CN 103836067 6/2014
DE 202013100985 7/2013
(Continued)

OTHER PUBLICATIONS

"Blue 100™ Transformer" by Brendle GmbH & Co. KG, downloaded from the Internet on Jun. 15, 2015, at http://nozzle-depot.com/contents/en-uk/d87_Seite_87.html.

*Primary Examiner* — Nicholas J Lane
(74) *Attorney, Agent, or Firm* — Greenberg Traurig, LLP

(57) ABSTRACT

A speed retarding device for a rotary nozzle includes a hollow cylindrical housing and a rotatable tubular shaft rotatably carried by the housing. The shaft has a central axial bore and an enlarged drag sleeve portion carried in the housing. A pair of support bearings support the drag sleeve portion of the shaft in the housing. An annular inner seal between each of the support bearings and the drag sleeve portion defines a cavity within the housing receiving a viscous fluid confined within the cavity. The drag sleeve portion includes a peripheral helical groove and a plurality of axial bores extending therethrough parallel to the central bore, one or more blind axial bores each having a closed end an open end, and a piston disposed in each of the one or more blind axial bores each defining an air space between the closed end and the piston.

19 Claims, 4 Drawing Sheets

(51) Int. Cl.
  *B05B 3/06* (2006.01)
  *F16F 9/14* (2006.01)
  *F16F 9/06* (2006.01)
  *B05B 3/10* (2006.01)
(58) Field of Classification Search
  CPC . B05B 3/005; B05B 3/06; F16D 57/00; F16D 57/005; F16D 57/02
  See application file for complete search history.

(56) References Cited

U.S. PATENT DOCUMENTS

| | | | | |
|---|---|---|---|---|
| 4,164,325 A | * | 8/1979 | Watson | B05B 3/06 |
| | | | | 137/167 |
| 4,632,576 A | | 12/1986 | Neal | |
| 5,005,859 A | * | 4/1991 | Satoh | B60G 11/183 |
| | | | | 188/130 |
| 5,058,806 A | | 10/1991 | Rupar | |
| 5,503,334 A | | 4/1996 | Pacht | |
| 5,909,848 A | | 6/1999 | Zink | |
| 5,947,387 A | | 9/1999 | Zink | |
| 5,964,414 A | | 10/1999 | Hardy et al. | |
| 6,027,040 A | | 2/2000 | Frye-Hammelmann | |
| 6,059,202 A | | 5/2000 | Zink et al. | |
| 6,082,507 A | * | 7/2000 | Forster | B60G 13/06 |
| | | | | 188/296 |
| 6,263,534 B1 | | 7/2001 | McCann et al. | |
| 7,523,817 B2 | * | 4/2009 | Forster | F16F 9/145 |
| | | | | 188/296 |
| 9,879,753 B2 | * | 1/2018 | McGill | B64C 27/635 |
| 2002/0125086 A1 | * | 9/2002 | Oliver | B60G 7/02 |
| | | | | 188/290 |
| 2004/0016540 A1 | | 1/2004 | Jarchau et al. | |
| 2004/0145099 A1 | * | 7/2004 | Kojima | F16F 9/064 |
| | | | | 267/64.15 |
| 2007/0014502 A1 | | 1/2007 | Dagh | |
| 2008/0035184 A1 | * | 2/2008 | Wagner | B05B 3/0427 |
| | | | | 134/112 |
| 2008/0257932 A1 | | 10/2008 | Kah | |
| 2008/0304780 A1 | | 12/2008 | Klintenstedt | |
| 2009/0206557 A1 | | 8/2009 | Wright | |
| 2011/0031325 A1 | | 2/2011 | Perkins et al. | |
| 2011/0108636 A1 | * | 5/2011 | Wright | B05B 15/16 |
| | | | | 239/251 |
| 2015/0083536 A1 | | 3/2015 | Colton | |
| 2016/0008826 A1 | * | 1/2016 | Schneider | B05B 3/005 |
| | | | | 188/296 |
| 2016/0201744 A1 | | 7/2016 | Sesser et al. | |

FOREIGN PATENT DOCUMENTS

| | | |
|---|---|---|
| JP | 2009-293529 | 12/2009 |
| KR | 20150000443 A | 1/2015 |
| WO | WO2011/059847 | 5/2011 |
| WO | WO2014/017052 | 1/2014 |

* cited by examiner

VISCOUS SPEED RETARDING DEVICE FOR ROTARY NOZZLES WITH INTERNAL PISTON FOR THERMAL EXPANSION

CROSS REFERENCED TO RELATED APPLICATIONS

This application claims the benefit of priority of U.S. Provisional Patent Application Ser. No. 62/745,172, filed Oct. 12, 2018, the disclosure of which is incorporated by reference herein in its entirety.

BACKGROUND OF THE DISCLOSURE

The present disclosure is directed to high pressure fluid rotary nozzle systems. In particular, embodiments of the present disclosure are directed to an apparatus for retarding the speed of rotation of such rotary nozzles.

High pressure water jet cleaning devices utilizing reaction force rotary nozzles tend to rotate at very high speeds. In many applications it is desirable to slow down such rotary nozzle speed to maximize usable lifetime of the rotary nozzle and effectively improve the cleaning efficiency of such nozzles. A speed reducing device fastened to the shaft of such rotary nozzles is often utilized to retard rotation of the nozzle. Typical viscous fluid speed reducing devices utilize a viscous fluid flowing along a tortuous flow path in a confined space around the rotating shaft to generate a drag on the nozzle shaft.

Typically the operational lifetime of the speed reducing device is limited by the longevity of the bearings and the medium such as a viscous fluid utilized to produce the speed retardation. As an example, the useful lifetime without maintenance of conventional viscous speed retarders is on the order of 40-60 device operating hours. A typical retarder device has a bearing supported shaft connected to the rotary nozzle such that the shaft rotates with the nozzle. A generally cylindrical housing contains the two support bearings supporting the rotating shaft and contains the retarding mechanism. One such retarding mechanism has a series of bearings immersed in a viscous fluid within the housing and between end support bearings that are also immersed in the viscous fluid. Another exemplary conventional retarder is a Warthog WG-1 by Stoneage Inc. This retarder has end support bearings sandwiching a large diameter drag sleeve fastened to or integrally formed around the shaft in the housing instead of utilizing a series of bearings in the viscous fluid. These support bearings and the drag sleeve are immersed in the viscous fluid contained within the cylindrical housing. Together the support bearings and the retarding drag sleeve are contained between two shaft seals, sealing the shaft to the housing, and preventing escape of the viscous fluid. Thus the end support bearings and the drag sleeve in the WG-1 are immersed in viscous fluid and function together to retard the speed of the rotating nozzle.

As the retarder rotates in the housing, the viscous fluid is circulated (pumped) within the fluid chamber by a helical groove around the outer surface of the drag sleeve portion of the shaft and through a series of axially extending bores through the drag sleeve portion of the shaft. Additionally, the helical groove serves to uniformly distribute the fluid about the drag sleeve. Drag is created as a function of the fluid viscosity, the surface area of the drag sleeve and the gap size between the drag sleeve and the cylindrical housing. This generates heat during operation, which has a detrimental effect on the life of the speed control due to pressurization of the shaft seals. Therefore what is needed is a viscous retarder device that has a substantially improved operational lifetime in order to solve these problems.

SUMMARY OF THE DISCLOSURE

The present disclosure directly addresses such needs. An apparatus in accordance with the present disclosure is a speed reducing or limiting device for a rotary nozzle that exhibits an improved operational lifetime between maintenance periods. This improved longevity increase is achieved by providing a mechanism within the viscous fluid chamber that accommodates thermal expansion of the components and the fluid without degrading the shaft seals or the shaft.

An exemplary embodiment of a retarder in accordance with the present disclosure includes a hollow generally cylindrical housing that carries an elongated shaft having a retarding or drag portion between forward and rear support bearings. Each of the support bearings is isolated from the retarding or drag portion of the elongated shaft within the housing by an annular seal. A conventional viscous fluid material such as gear oil or silicone fills the housing around the retarding portion of the shaft between the two annular seals. A variable volume thermal expansion chamber is incorporated within the rotating shaft in the housing to accommodate viscous fluid expansion due to changes in temperature during retarder operation.

An exemplary embodiment in accordance with the present disclosure may be viewed as a speed retarding device for a rotary component such as a nozzle. This device includes a hollow cylindrical housing, an elongated rotatable tubular shaft having a central bore, the shaft being rotatably carried by the housing. The shaft has a drag portion in the housing and has a shaft end extending through at least one end of the housing for receiving a rotary component thereon. A pair of support bearings supports the drag portion of the shaft in the housing. An annular axial inner seal is positioned between each of the support bearings and the drag portion. These inner seals sandwich the drag portion therebetween and isolate the drag portion from the support bearings. The inner seals, the housing and the drag portion define a cavity within the housing. The drag portion has a peripheral helical groove and a plurality of bores therein parallel to the central bore. At least one of the plurality of bores being a blind bore having a closed end and an open end, the open end carrying a piston therein, forming a gas, preferably air, chamber between the closed end of the blind bore and the piston.

A viscous fluid is confined within the cavity between the seals, the sleeve portion and the inner surface of the housing. It is this viscous fluid circulating within the cavity that produces a drag on rotation of the shaft. During operation, this viscous fluid heats up due to friction and tends to expand. The piston within the blind bore expands against the air space within the blind bore to accommodate this expansion, thus preventing expansion of the fluid against the inner seals thereby prolonging lifetime operability of the viscous fluid.

An embodiment in accordance with the present disclosure may also be viewed as a speed retarding device for a rotary component such as a rotary high pressure fluid nozzle. The device includes a hollow cylindrical housing, a rotatable tubular shaft rotatably carried by the housing, the shaft having a drag sleeve portion in the housing having a shaft end extending through at least one end of the housing. A pair of support bearings supports the drag sleeve portion of the shaft in the housing, with an annular inner seal between each of the support bearings and the drag sleeve portion. The inner seals, the housing and the drag sleeve portion define a cavity within the housing confining a viscous fluid. The drag portion has a peripheral helical groove and plurality of bores therethrough parallel to the central bore of the tubular shaft forming a circuit for flow of viscous fluid during retarder operation, and at least one blind bore having a closed end and an open end, preferably parallel to the central bore, although the blind bore could be perpendicular to or at an angle to the center bore of the tubular shaft. The open end of the one or more blind bores carries a piston therein closing the open end and forming a gas space or air chamber within the blind bore between the closed end and the piston. During device operation, the viscous fluid heats up, and tends to expand. This expansion is accommodated in accordance with the present disclosure by movement of the piston in the blind bore compressing the air space until a balance is achieved.

Further features, advantages and characteristics of the embodiments of this disclosure will be apparent from reading the following detailed description when taken in conjunction with the drawing figures.

DETAILED DESCRIPTION

Figure 1:
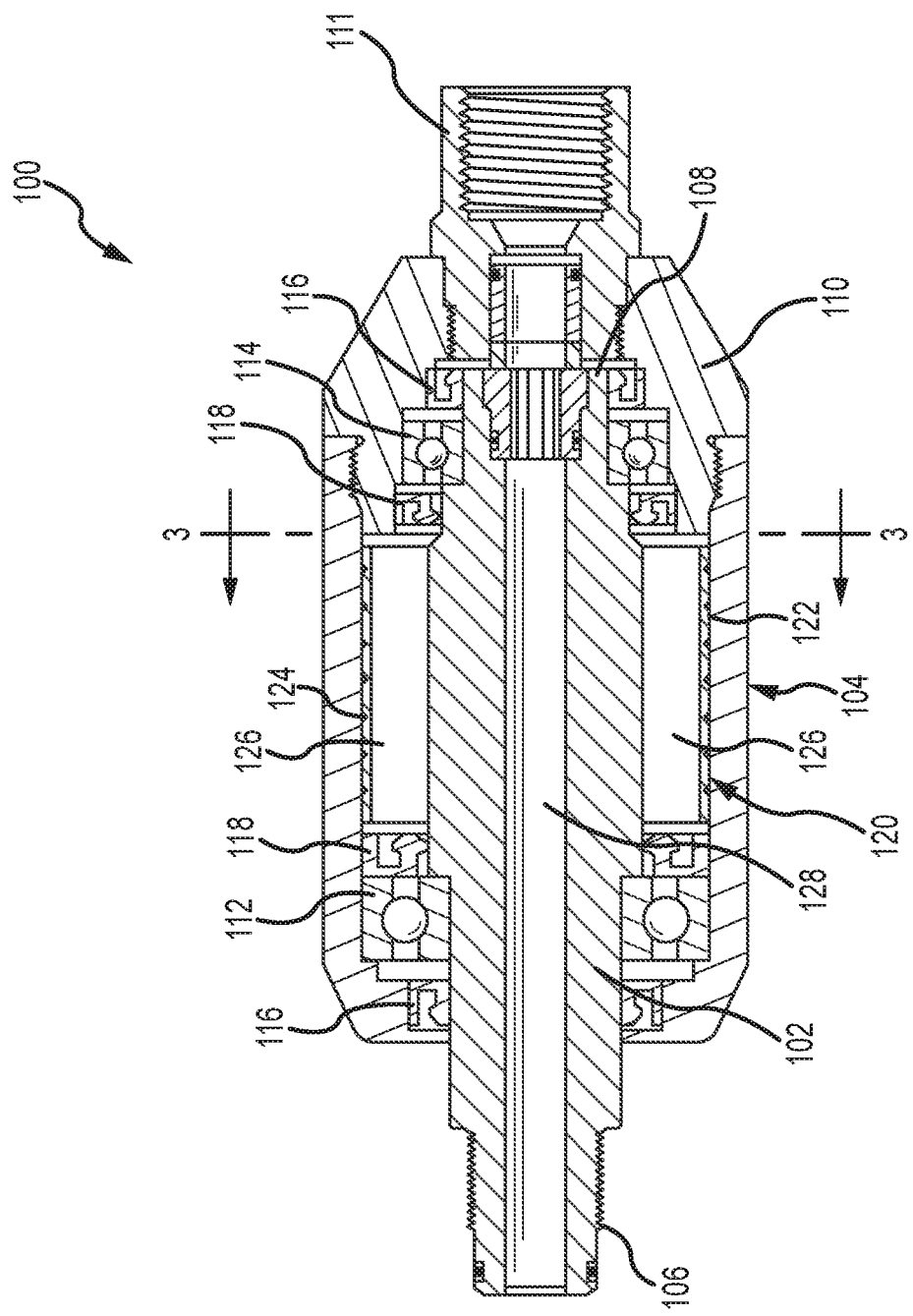
FIG. 1 is an axial cross sectional view through a retarder device in accordance with the present disclosure configured to be fastened to a rotary nozzle head (not shown).

An exemplary embodiment of a retarder device 100 in accordance with the present disclosure configured to be connected to a rotary nozzle is shown in sectional view in FIG. 1. The retarder device 100 includes a tubular shaft 102 carried within a generally cylindrical tubular housing 104. The shaft 102 has a distal end 106 configured to be fastened to a nozzle and an opposite end 108 coupled with an inlet nut 110 that is connected to a fitting 111 for receiving a high pressure fluid hose (not shown).

This cylindrical housing 104 also carries within it a first support bearing 112 and a second support bearing 114 which together rotatably support the shaft 102. Each of the bearings 112 and 114 is sandwiched between a pair of shaft seals 116 and 118.

The shaft 102 also has a cylindrical drag portion 120 between the two shaft seals 118. This retarding portion 120 is preferably an integral part of the shaft 102 and has a large diameter outer cylindrical surface 122 sized to closely fit within the housing 104. This surface 122 has a peripheral helical groove 124 that extends from one end to the other of the retarding portion 120. The retarding portion 120 further has a plurality of axially extending through bores 126 spaced around the axial bore 128 through the shaft 102.

Figure 2:
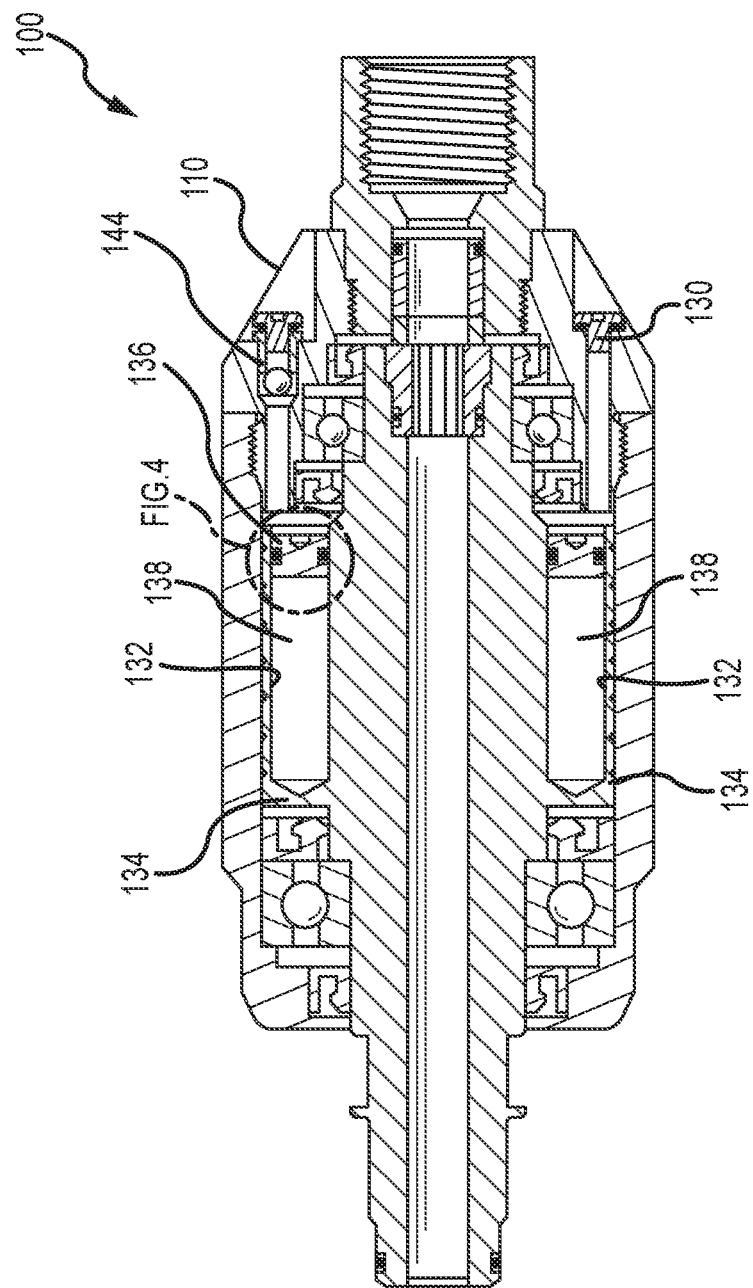
FIG. 2 is an axial cross sectional view through the retarder device shown in FIG. 1 rotated 30 degrees to reveal chambers carrying thermal expansion pistons in accordance with the present disclosure.

The retarding or drag portion 120 is captured on the shaft 102 within the housing 104 by the front and rear inner seals 118. A pair of threaded ports 130 (one of which is shown in FIG. 2) permits filling the space within the housing 104, and around and within the retarding portion 120, with a high viscosity fluid such as silicone fluid having a kinematic viscosity within a range of 200 to 60,000 cSt, and more preferably within a range of 200 cSt to 15,000 cSt. During operation, the viscous fluid is pumped via action of the fluid in the helical groove 124, around the exterior of the retarding portion 120 and through the bores 126, generating drag. The speed range of the retarder 100 is determined by the viscous fluid viscosity and torque provided by the high pressure fluid passing through the nozzle. The retarding capacity of the retarder 100 is determined by the viscous fluid viscosity, the cylindrical surface 122 length and outer diameter, and the gap between the cylindrical surface 122 and the housing 104. This retarding capacity serves to resist the torque generated by the nozzle when high pressure fluid such as water is channeled through the bore 128. The resulting net forces dictate the rotational speed of the nozzle relative to the retarder 100. There are additional secondary retarding forces, operating torque from the high pressure seal, intrinsic bearing drag and shaft seal drag. However, these forces are essentially fixed as a function of the design and the reasonable life of the related parts. These forces are intended to be dominated by the retarding mechanism and the nozzle torque.

Figure 3:
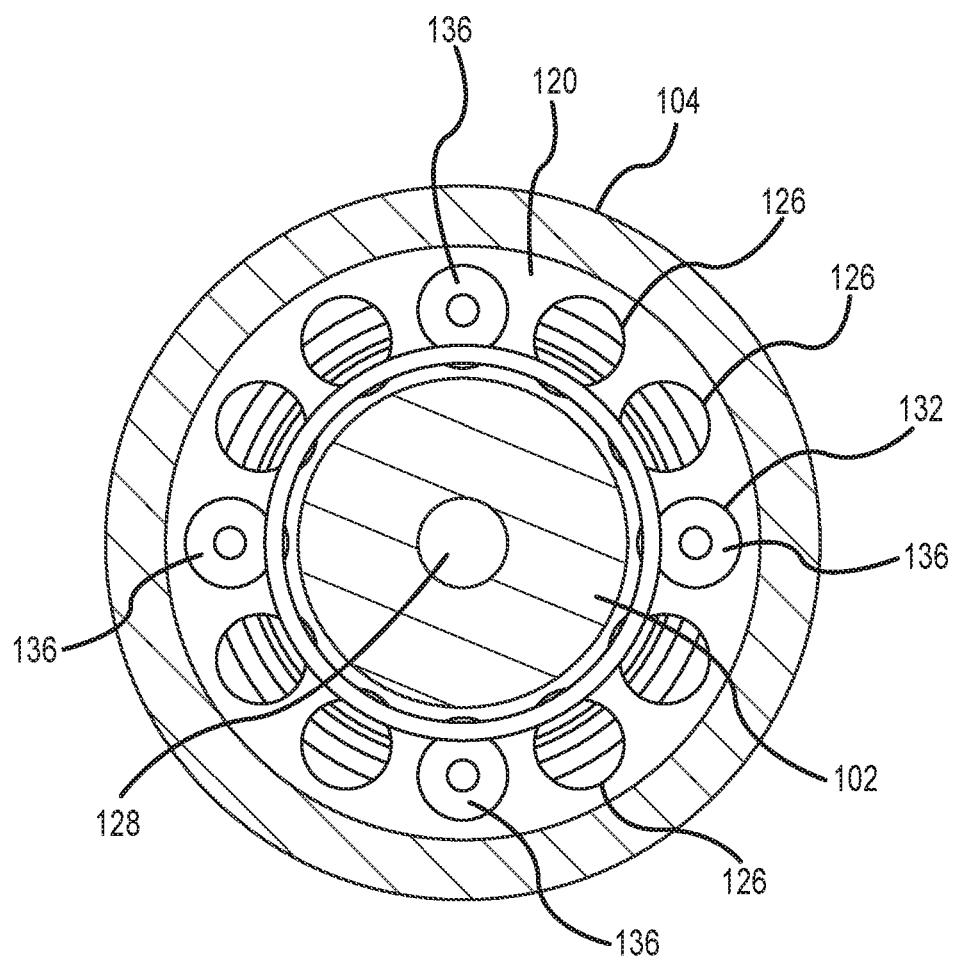
FIG. 3 is a lateral cross-sectional view through a retarder device shown in FIG. 1 taken on the line 3-3 in FIG. 1 showing the arrangement of thermal expansion pistons installed in cardinal chambers in the rotary shaft.

An axial cross sectional view of the retarder 100, rotated 30 degrees, is shown in FIG. 2. The embodiment of the retarder 100 shown has four axial blind bores 132, two of which are visible in FIG. 2. Each blind bore 132 has a closed end 134 and carries a cylindrical piston 136 therein defining a gas chamber 138 therebetween, preferably containing air. FIG. 3 shows essentially an end view of the retarding portion 120 of the retarder device 100. There are four blind bores 132 spaced at cardinal positions 90 degrees apart between the through bores 126. Each of the blind bores 132 receives a cylindrical piston 136.

Figure 4:
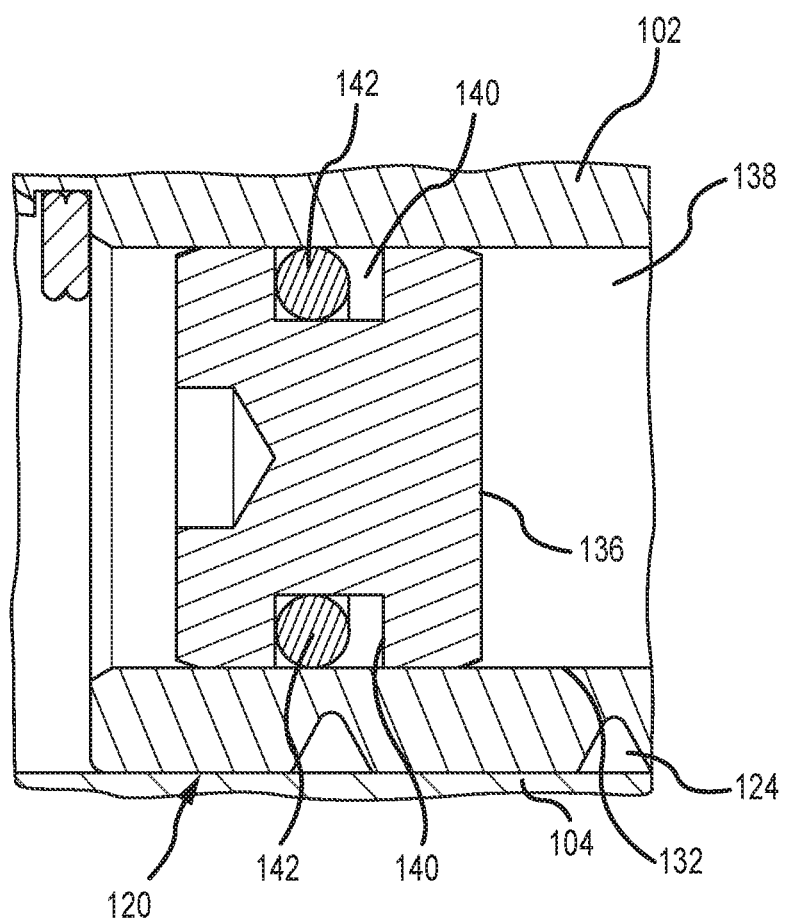
FIG. 4 is an enlarged axial partial section view seen in FIG. 2 of one of the chambers showing the thermal expansion piston in the rotary shaft of the retarder device.

An enlarged cross sectional view of one of the pistons 136 in a blind bore 132 is shown in FIG. 4. Each piston 136 is a generally cylindrical body having a peripheral groove 140 receiving an O-ring 142 that seals the air chamber 138 from the viscous fluid that circulates between the sleeve portion 120 and the housing 104 on the other side of the piston 136.

Referring back to FIG. 2, a check valve port 144 is visible in the inlet nut 110. After initial fill of viscous fluid through the fill port 130, this check valve port 144 is used to allow for extra fluid to be loaded into the retarder device 100, displacing the piston and initially pressurizing the air chambers 138.

During operation of the device 100, friction is generated by the retarding action of the viscous fluid within the device 100. This friction generates heat which tends to cause the fluid to expand and push against the seals 118. The presence of the air chambers 138 permits the expanding fluid to push the pistons 136 into the blind bores 132 rather than push against the seals 118, thereby removing a degrading force from the seals 118 thus increasing the useful life of the seals 118, which in turn lengthens the time between necessary overhauls of the retarding device 100.

Furthermore, assembling the retarder device 100 and pressurizing with an initial pressure in the air chambers 138 will displace the pistons 136 and provide a reservoir of extra viscous fluid within the blind bores 132 in the event fluid is leaked out from the shaft seals 118. This additionally preserves the effectiveness of the speed control by maintaining sufficient fluid levels within the device 100.

Many changes may be made to the device, which will become apparent to a reader of this disclosure. For example, the helical groove 124 may have an Acme thread profile, a buttress thread profile, or a 55 degree or 60 degree thread profile. The air space or chamber 138 within each of the blind bores 132 may be pressurized or alternatively evacuated prior to installation of viscous fluid through the ports 130 into the space between the rotary shaft 102 and housing 104. Each chamber 138 may be filled with a gas such as air, nitrogen, or an inert gas. All such changes, alternatives and equivalents in accordance with the features and benefits described herein, are within the scope of the present disclosure. Any or all of such changes and alternatives may be introduced without departing from the spirit and broad scope of my disclosure and invention as defined by the claims below and their equivalents.

What is claimed is:

1. A speed retarding device for a rotary component comprising:
    a hollow cylindrical housing;
    a rotatable tubular shaft having a central bore, the shaft being rotatably carried by the housing, the shaft having a cylindrical drag portion in the housing and having a shaft end extending through at least one end of the housing, wherein the shaft end is adapted to receive a reaction force rotary nozzle thereon, the drag portion having a plurality of bores therethrough parallel to the central bore and at least one blind bore having a closed end and an open end, the open end carrying a piston therein defining an air chamber between the closed end and the piston;
    a pair of lubricated support bearings supporting the cylindrical drag portion of the shaft in the housing; and
    a viscous fluid confined within the housing in a cavity formed between the shaft and the drag portion, wherein the piston in the blind bore moves within the blind bore parallel to the central bore to absorb thermal expansion of the viscous fluid in the cavity.

2. The retarding device according to claim 1 further comprising an annular axial inner seal between each of the support bearings and the cylindrical drag portion, wherein the inner seals sandwich the drag portion therebetween and isolate the drag portion from the support bearings.

3. The retarding device according to claim 2 further comprising an outer annular seal on the shaft adjacent to each support bearing whereby each support bearing is sandwiched between inner and outer annular seals in the housing and separated from the viscous fluid in the cavity.

4. The retarding device according to claim 1 wherein the viscous fluid is separated from the at least one blind bore by the piston.

5. The retarding device according to claim 1 wherein the piston in the at least one blind bore defines a chamber between the closed end of the blind bore and the piston.

6. The retarding device according to claim 5 wherein the chamber is an air chamber.

7. The retarding device according to claim 5 further comprising four blind bores each carrying a piston therein and at least four through bores in the drag portion of the tubular shaft.

8. The retarding device according to claim 1 wherein the drag sleeve portion has an outer cylindrical surface and a peripheral helical groove in the outer cylindrical surface.

9. The retarding device according to claim 5 further comprising an outer annular seal on the shaft adjacent to each support bearing whereby each support bearing is sandwiched between inner and outer annular seals in the housing and separated from the viscous fluid in the cavity.

10. The retarding device according to claim 8 wherein the viscous fluid is separated from the at least one blind bore by the piston.

11. The retarding device according to claim 8 wherein the piston in the at least one blind bore defines an air chamber between the closed end of the blind bore and the piston.

12. The retarding device according to claim 11 further comprising four blind bores each carrying a piston therein and at least four through bores in the drag portion of the tubular shaft.

13. A speed retarding device for a rotary nozzle comprising:
    a hollow cylindrical housing;
    a rotatable tubular shaft rotatably carried by the housing, the shaft having a central bore and a drag portion in the housing and having a shaft end extending through at least one end of the housing;
    a pair of lubricated support bearings supporting the drag portion of the shaft in the housing;
    an annular inner seal between each of the support bearings and the drag portion, wherein the inner seals, the housing and the drag portion define a cavity within the housing;
    the drag portion having a peripheral helical groove and plurality of bores therethrough parallel to the central bore and at least one blind bore parallel to the central bore having a closed end and an open end, the open end carrying a piston therein closing the open end and forming an air chamber within the at least one blind bore between the closed end and the piston; and
    a viscous fluid confined within the cavity, wherein the piston in the blind bore moves within the blind bore parallel to the central bore to absorb thermal expansion of the viscous fluid in the cavity.

14. The retarding device according to claim 13 further comprising an outer annular seal on the shaft adjacent to each support bearing whereby each support bearing is sandwiched between inner and outer annular seals in the housing and separated from the viscous fluid in the cavity.

15. A speed retarding device for a rotary component, the device comprising:
    a hollow cylindrical housing;
    a rotatable tubular shaft rotatably carried by the housing, the shaft having a central bore and a drag portion in the housing having a shaft end extending through at least one end of the housing;
    a pair of lubricated support bearings supporting the drag portion of the shaft in the housing;
    the drag portion having a plurality of bores therethrough parallel to the central bore of the tubular shaft and at least one blind bore parallel to the central bore having a closed end and an open end, the open end carrying a movable piston therein closing the open end and forming an air chamber within the blind bore between the closed end and the piston; and
    a viscous fluid confined within a cavity formed between the housing, the support bearings and an external surface of the drag portion, wherein the piston in the blind bore moves within the blind bore parallel to the central bore to absorb thermal expansion of the viscous fluid in the cavity.

16. The retarding device according to claim 15 further comprising an annular inner seal between each of the support bearings and the drag sleeve portion, wherein the inner seals, the housing and the drag portion restrict the cavity within the housing.

17. The retarding device according to claim 16 further comprising an outer annular seal on the shaft adjacent to each support bearing whereby each support bearing is sandwiched between one of the inner seals and one of the outer annular seals in the housing and separate the support bearings from the viscous fluid in the cavity.

18. The retarding device according to claim 16 wherein the drag sleeve portion has a cylindrical outer surface and a helical groove around the drag sleeve portion formed in the outer surface.

19. The retarding device according to claim 18 wherein the piston further comprises an annular O-ring seal therearound isolating the air chamber from the viscous fluid in the cavity.

* * * * *